S. TAUSCH.
WEEDING IMPLEMENT.
APPLICATION FILED NOV. 15, 1920.

1,386,141.

Patented Aug. 2, 1921.
2 SHEETS—SHEET 1.

Inventor
Steven Tausch

By Herbert E. Smith
Attorney

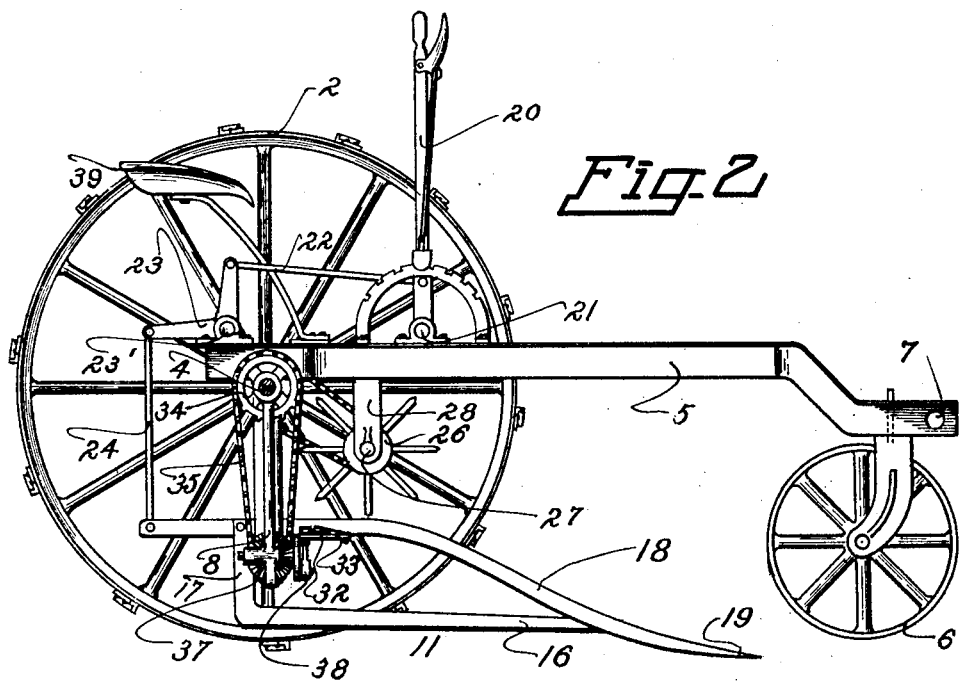
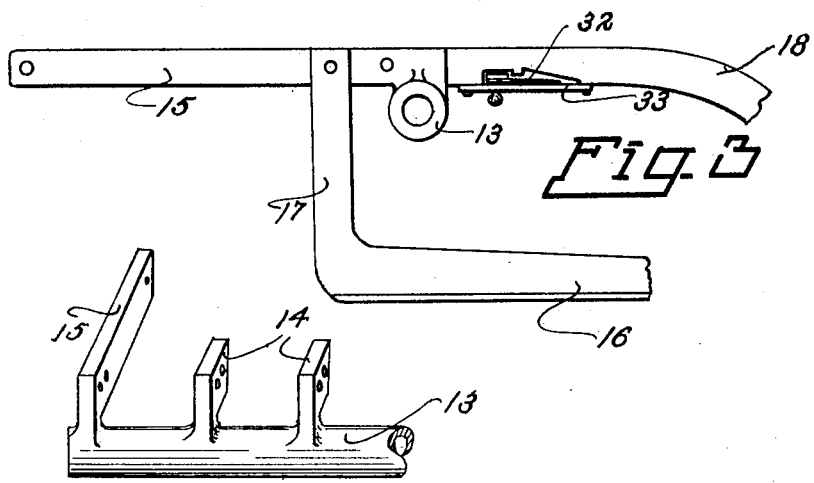
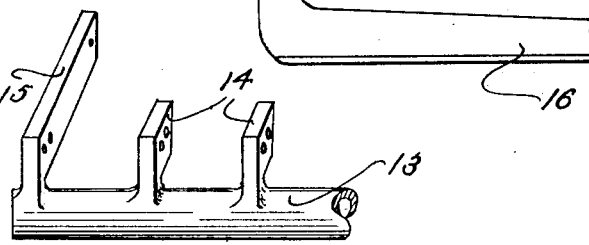

UNITED STATES PATENT OFFICE.

STEVEN TAUSCH, OF SPOKANE, WASHINGTON.

WEEDING IMPLEMENT.

1,386,141. Specification of Letters Patent. Patented Aug. 2, 1921.

Application filed November 15, 1920. Serial No. 424,086.

*To all whom it may concern:*

Be it known that I, STEVEN TAUSCH, a citizen of the United States, residing at Spokane, in the county of Spokane and State of Washington, have invented certain new and useful Improvements in Weeding Implements, of which the following is a specification.

The present invention relates to improvements in weeding implements designed for use in cultivation of the soil and especially for clearing the soil of roots, weeds and rank vegetation, the primary object of the invention being the provision of an implement whereby the weeding operation may be accomplished quickly and thoroughly preparatory to plowing or cultivating the ground.

The invention is specially designed for providing means for entering beneath the surface of the soil for picking up weeds and rank vegetation and roots, passing the gathered weeds to the rear of the implement and there cutting the weeds for final disposition or deposit on the ground. Means are also provided for cutting or severing the roots from the ground and from the vegetation as the implement progresses.

To this end the invention consists in certain novel combinations and arrangements of parts involving a rigid row of adjustable digging teeth to enter below the surface of the soil in conjunction with a transversely reciprocating cutting mechanism for the weeds or vegetation gathered by the teeth; in the novel manner of mounting the row of teeth on the implement; and further in details of construction as will be hereinafter more fully described and claimed.

In the accompanying drawings I have illustrated one complete example of the physical embodiment of my invention, wherein the parts are combined and arranged according to the best mode I have thus far devised for the practical application of the principles of my invention.

Fig. 2 is a view at line 2—2 of Fig. 1, looking to the right, with one of the traction wheels removed for convenience of illustration.

Fig. 3 is an enlarged detail view of one of the end plow or digging teeth showing the rocking sleeve which supports all of the digging teeth in the implement.

Fig. 4 is a detail, fragmentary view in perspective of the rock sleeve that supports the teeth.

Figure 1:
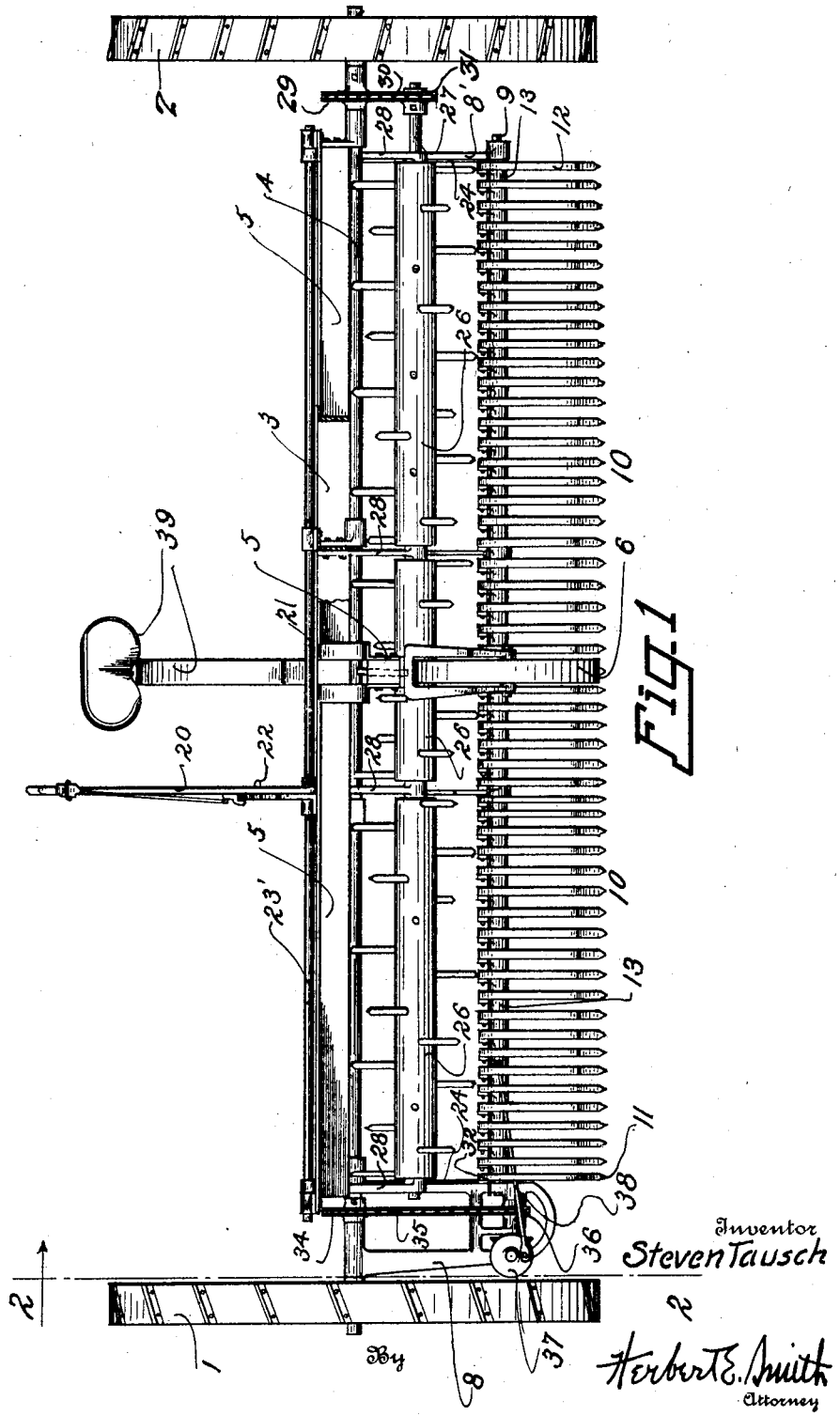
Figure 1 is a view in front elevation of an implement of the horse drawn type, embodying my invention.

In the preferred form of the invention as illustrated in the drawings I utilize a pair of traction wheels 1 and 2 supporting the main frame 3 in which the axle 4 is journaled to revolve with the wheels and actuate the operating parts of the implement. A longitudinal draft beam 5 is projected toward the front from the main frame, under which the caster 6 is journaled in usual manner, and horse power may be applied to the beam, as at 7 for drawing the implement.

Near the respective lateral ends of the main frame and within the two traction wheels are provided drop frames or rigid hangers 8 and 8′ in which are suspended a transversely extending bar 9, located directly beneath and in the same vertical plane as the axle of the implement, and upon this bar are supported a multiplicity of diggers or plow teeth, indicated as a whole by the numeral 10, the respective end teeth of the row being designated 11 and 12. The teeth project forward in a generally horizontal plane, below the main frame and axle, and are adapted to enter the soil beneath its surface for uprooting the weeds as the implement is drawn over the ground.

While each plow tooth is an independent element, they are all rigidly held together and movable with relation to the soil on the bar 9, and to this end a rock sleeve 13 is provided extending the full length of the bar 9, and fashioned with a number of bracket arms 14 rising above the sleeve and extending toward the rear of the implement. At its ends the sleeve is equipped with special lever arms 15, 15 corresponding to the bracket arms 14, but longer and extending toward the rear of the implement.

The formation of the plow teeth is indicated in Figs. 2 and 3 to best advantage, and here it will be observed that each tooth has a lower, straight, horizontal cutting blade 16 of angular form in cross section and provided with a lateral cutting edge for severing roots etc. At the rear the cutting blade has an angle arm 17 projecting vertically therefrom and attached to the bracket arm 14 or the lever arm 15 on the sleeve as the case may be. Above the cutting blade and located in the same vertical plane is a tine 18 attached at its rear end to the bracket on the sleeve above the supporting bar 9 and curving downwardly below the level of the cutting blade and terminating at the point of convergence therewith in a sharpened and slightly upwardly curving point 19 adapted to enter beneath the surface of the soil and uproot the weeds.

The plow teeth are thus rigidly joined to the rocking sleeve and may be adjusted on the bar 9, in unison, either to vary the depth of the plowing action beneath the soil, or to elevate the weeding teeth, bodily, to inoperative position when not to be used.

The movement of the weeding teeth is accomplished by means of the operating lever 20 of usual type pivoted at 21 on the main frame and equipped with a link 22 reaching rearwardly to the bell crank lever arm 23 which is pivoted at 23' by means of a rock shaft on the main frame. A connecting rod 24 is pivoted at its ends to the bell crank lever and to the lever arm 15 of the sleeve. There are two bell crank levers and two connecting rods 24, one of each of the latter being connected to one of the lever arms 15. Thus it will be apparent that by operating the lever 20 the plow teeth may be swung on the supporting bar through the instrumentality of the rock sleeve 13, and the connections from the lever 20, for the purposes described.

With the plow teeth in the desired position their points 19 are dragged through the top surface of the soil uprooting the weeds and rank vegetation, the roots being severed by the cutting blades 16, and the plants ride up on the tines 18 of the teeth, to the rear. To facilitate the movement of the weeds I employ a rotary beater 26, with spurs or spikes, to engage the weeds, and located just above the highest point of the tines, with the ends of the spurs or spikes passing closely over the tines. The rotary beater is preferably made up in sections fixed on the transverse shaft 27 that is journaled in hangers 28 rigidly supported from the main frame, and the shaft is revolved from the main axle through the action of the sprocket wheel 29 thereon, sprocket chain 30 and sprocket wheel 31 on the shaft 27. The shaft 27 revolves in unison with the main axle, and the weeds are thus passed rearwardly of the implement.

For cutting the weeds as they pass to the rear, I employ a transversely reciprocating cutter 32 of the sickle type, supported in plates 33 secured to the tines 18 of the plow teeth, and the cutting bar of the sickle is reciprocated from the main axle through the instrumentality of a sprocket wheel 34 on the axle, sprocket chain 35, and sprocket wheel 36 which mechanism is supported in the drop frame 8 at the left end of the implement in Fig. 1. The sprocket wheel 36 is utilized by suitable connections to drive the operating mechanism 37 of the sickle which is connected to the cutter bar by the pitman 38 in the usual manner, to reciprocate the cutter bar or blade for cutting the weeds.

The operating parts are controlled by the driver who occupies the usual seat 39 above the main frame of the implement, and power is applied to the operating mechanism from the traction wheels and axle, the usual and necessary clutch devices or accessories being employed as desired.

From the above description taken in connection with my drawings it is evident that I have devised an implement of this type which fulfils the purposes of my invention, and performs its required functions with facility and mechanical correctness, and while I have illustrated one complete example of the embodiment of the invention, it will be understood that colorable changes and alterations may be made therein without departing from the spirit of the invention or the scope of my appended claims.

Having thus fully described my invention, what I claim as new and desire to secure by Letters Patent is—

1. The combination in an implement as described including the traction wheels, and main frame, of drop frames and a supporting bar therein, a rock sleeve on said bar, a plurality of weeding teeth attached to said sleeve, said teeth each comprising a lower approximately horizontal cutting blade and a curved tine, and said blade and tine converging and terminating in a digging point, and means for rocking said sleeve for the purpose described.

2. The combination in an implement as described including traction wheels, axle and main frame, of a transversely extending bar supported from said frame, a plurality of longitudinally disposed weeding teeth rigidly connected and oscillatable on said bar, a rotary beater transversely disposed above said teeth, a transversely reciprocating cutting device at the rear of said beater and co-acting with said teeth, and means actuated from said axle for operating said beater and cutting device.

3. The combination in an implement as described with a supporting bar, of a sleeve oscillatable thereon and provided with brackets, a plurality of longitudinally disposed weeding teeth each comprising a lower cutting blade having an angle arm attached to a bracket and a pointed, integral tine diverging from said blade and attached to said bracket, and means for oscillating said sleeve.

4. The combination with a fixed bar of a rock sleeve thereon having end lever arms and intermediate bracket arms, of a series of weeding teeth each having a cutting blade formed with an angle arm attached to one of said arms at the rear of said sleeve and an integral, pointed, tine diverging from said blade and attached to said arm above the sleeve, and means for oscillating said sleeve.

5. The combination in an implement as described including traction wheels, axle and main frame, of a transversely extending bar supported from said frame, a plurality of longitudinally disposed weeding teeth connected together and oscillatable on said bar, a transversely reciprocating cutting device supported on and co-acting with said teeth, and means actuated from said axle for operating said cutting device.

In testimony whereof I affix my signature.

STEVEN TAUSCH.